(12) United States Patent
Wojtowicz

(10) Patent No.: US 8,400,037 B2
(45) Date of Patent: Mar. 19, 2013

(54) DEVICE FOR PROVIDING ROTATIONAL TORQUE AND METHOD OF USE

(76) Inventor: Chris Wojtowicz, Carlsbad, CA (US)

( * ) Notice: Subject to any disclaimer, the term of this patent is extended or adjusted under 35 U.S.C. 154(b) by 202 days.

(21) Appl. No.: 12/965,244

(22) Filed: Dec. 10, 2010

(65) Prior Publication Data

US 2012/0146443 A1    Jun. 14, 2012

Related U.S. Application Data

(63) Continuation-in-part of application No. 12/956,957, filed on Nov. 30, 2010, now abandoned.

(51) Int. Cl.
H02K 37/00  (2006.01)
(52) U.S. Cl. .......................... 310/152; 310/46
(58) Field of Classification Search ................. 310/152, 310/80, 46, 103
See application file for complete search history.

(56) References Cited

U.S. PATENT DOCUMENTS

| | | | |
|---|---|---|---|
| 3,670,189 A | 6/1972 | Monroe | |
| 3,703,653 A | 11/1972 | Tracy et al. | |
| 3,895,245 A * | 7/1975 | Bode | 310/46 |
| 4,151,431 A | 4/1979 | Johnson | |
| 4,598,221 A | 7/1986 | Lawson et al. | |
| 4,600,849 A | 7/1986 | Lawson et al. | |
| 4,882,509 A * | 11/1989 | Wottlin | 310/46 |
| 5,168,201 A | 12/1992 | Nomura | |
| 5,428,282 A * | 6/1995 | Johnson | 318/701 |
| 5,925,958 A * | 7/1999 | Pirc | 310/152 |
| 6,504,285 B2 | 1/2003 | Yun | |
| 6,867,514 B2 * | 3/2005 | Fecera | 310/46 |
| 6,954,019 B2 | 10/2005 | Sprain | |
| 7,626,297 B2 | 12/2009 | Brown | |
| 2002/0135256 A1 * | 9/2002 | Nikolic et al. | 310/178 |
| 2003/0062785 A1 * | 4/2003 | Vasudevan | 310/152 |
| 2003/0234590 A1 * | 12/2003 | Gitzen et al. | 310/152 |
| 2007/0052312 A1 | 3/2007 | Stanetskly et al. | |
| 2007/0222309 A1 | 9/2007 | Minker | |
| 2010/0237729 A1 | 9/2010 | Lawson | |

FOREIGN PATENT DOCUMENTS

FR    2664107    1/1992

* cited by examiner

Primary Examiner — Thanh Lam
(74) Attorney, Agent, or Firm — Stephen C. Beuerle; Procopio Cory Hargreaves & Savitch LLP

(57) ABSTRACT

A device for providing rotational torque includes a stator with a permanent magnet rotatably mounted contained within, a rotor arranged on one side of the stator, a pair of permanent magnets rotatably mounted on oppositely spacing sides of the rotor, which stator and rotors are arranged with gaps left therebetween in an axial direction of the driveshaft, the rotor being mounted to the driveshaft. For further acceleration of the rotor, there are mounted several permanent magnets in the stator housing, arranged in a circumferential arrangement relative to the rotor. These acceleration magnets are arranged such that the size increases with each acceleration magnet approaching the stator magnet.

12 Claims, 5 Drawing Sheets

DEVICE FOR PROVIDING ROTATIONAL TORQUE AND METHOD OF USE

FIELD OF THE INVENTION

The present invention is, in general, in the field of devices for providing rotational torque, and, in particular, in the field of permanent magnet motors.

BACKGROUND OF THE INVENTION

In known permanent magnet motors, the attractive forces of the stator magnets will cause the rotor to turn until the highest degree of attraction is obtained. However, this arrangement runs into a problem when trying to rotate past the last set of stator magnets which are closest to the poles of the rotor magnet. The effect known as cogging will tend to cause the rotor magnet to hold onto the stator magnet with the highest amount of attraction, thereby causing the rotor to stall. Electro-magnets are employed in the vast majority of permanent magnet motors to keep the rotor moving past the stator magnets. Electro-magnets, however require an external power source, which has been a seemingly inescapable feature of the common permanent magnet motor.

SUMMARY OF THE INVENTION

In view of the above described problem, an object of the present invention is to provide a means for reducing the separation forces in a permanent magnetic gate thereby reducing the energy loss.

An aspect of the present invention involves a permanent magnet device causing motion of a rotor relative to a stator. The permanent magnet device includes a magnetic gate that allows continued motion of the device without an external power source.

Another aspect of the present invention involves a device for providing rotational torque in the form of an axial motor comprising a stator with a permanent magnet rotatably mounted contained within, a rotor arranged on one side of the stator, a pair of permanent magnets rotatably mounted on oppositely spacing sides of the rotor, which stator and rotors are arranged with gaps left therebetween in an axial direction of the driveshaft, the rotor being mounted to the driveshaft. For further acceleration of the rotor, there are mounted several permanent magnets in the stator housing, arranged in a circumferential arrangement relative to the rotor. These acceleration magnets are arranged having increasing magnetic flux density, size with each acceleration magnet approaching the main stator magnet.

The rotor magnets include a means for independent rotation within the rotor timed for a specific movement therein relative to the stator magnet, allowing a parallel position to be held as the rotor magnet passes the main stator magnet.

The stator gate magnet includes a means for rotation timed with the circumferential location of the rotor magnets allowing a parallel position to be held relative to the passing rotor magnet.

The main stator and rotor magnets are rotated so as to have their pole faces pointed towards each other only as they are approaching.

The length of the main stator and rotor magnets are held in a specific proportion, the length of the main stator magnet being held to be longer than the rotor magnet. Further, the non working end of the main stator magnet is curved away from the rotor magnet.

The attractive pole faces of the main stator and rotor magnets are held with a convex surface (preferably a full radius).

With the constitution described above, since the magnetic field of a permanent magnet diminishes as it moves away from the pole face along the side face of the magnet, there exists a preferred means of separating two permanent magnets when arranged in a parallel configuration and when the main stator magnet is longer than the rotor magnet. As the rotor magnet moves away from the pole of the main stator magnet, it encounters a diminishing magnetic field. At this point the two magnets may be separated with less force than the maximum attractive force of either the main stator or rotor magnet. Therefore when the rotor magnet is moved past the main stator magnet, not all of the energy gained during the attractive phase of rotation is lost.

Preferably, the materials used to hold the rotor and stator magnets are non magnetic, since the as designed magnetic field arrangement is critical to the operation of the device.

The accelerator magnets form an attractive magnetic field of increasing strength as the rotor magnet approaches the main stator magnet, providing additional rotational energy to the rotor.

One or more implementations of the aspect of the invention described immediately above includes one or more of the following.

DETAILED DESCRIPTION OF PREFERRED EMBODIMENTS

Figure 1:
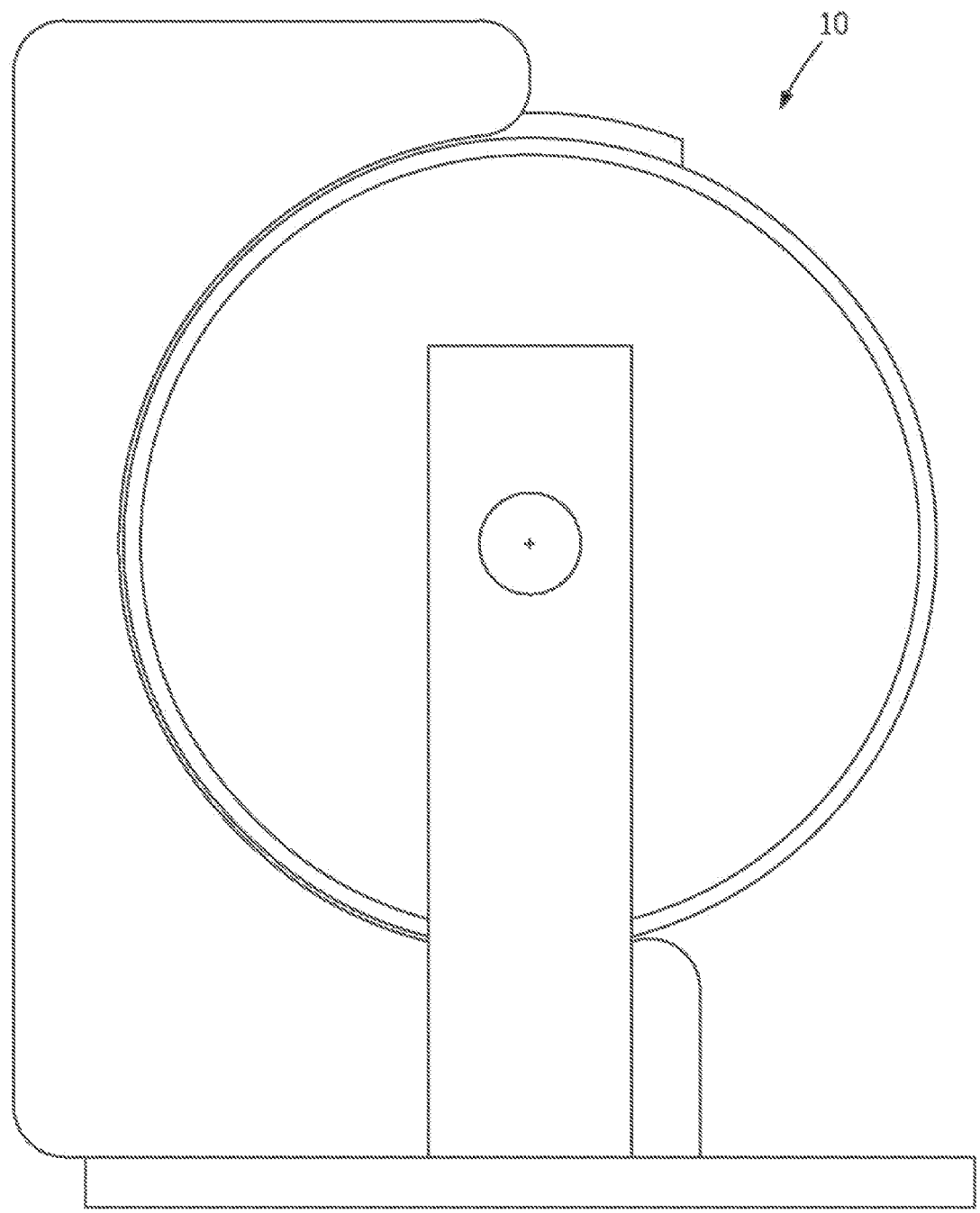
FIG. 1 is a side view of an embodiment of a permanent magnet motor.

With reference to FIGS. 1-5, an embodiment of a permanent magnet motor 10 and method of use that provide a magnetic gate that allows continued motion of a rotor relative to a stator without an external power source and with low cogging will be described. Although a permanent magnet motor is shown and described herein as an exemplary device for providing rotational torque, in alternative embodiments, the aspects of the present invention shown and described herein are applied to other types of devices for providing rotational torque. Permanent magnet motor 10 is an axial motor including a drive shaft 8 that penetrates a vertical support 4A, a bearing 6A, a rotor cam 18, a support plate 46, a rotor 48, a cam support 50, a stator cam plate 9, a bearing 6B, and a vertical support 4B. The vertical supports 4A and 4B are fixed to and supported by a base 2, with a gap left relative to the drive shaft 8. The stator cam plate 9, stator support 50, rotor 48, rotor support plate 46, and bearings 6A and 6B are externally fitted over and fixed to the drive shaft 8.

The rotor 48, stator 47, shafts 12A, 12B, and 20, support plates 29 and 46, shafts 41A and 41B, shaft 43 are all made from non magnetic material.

Figure 2:
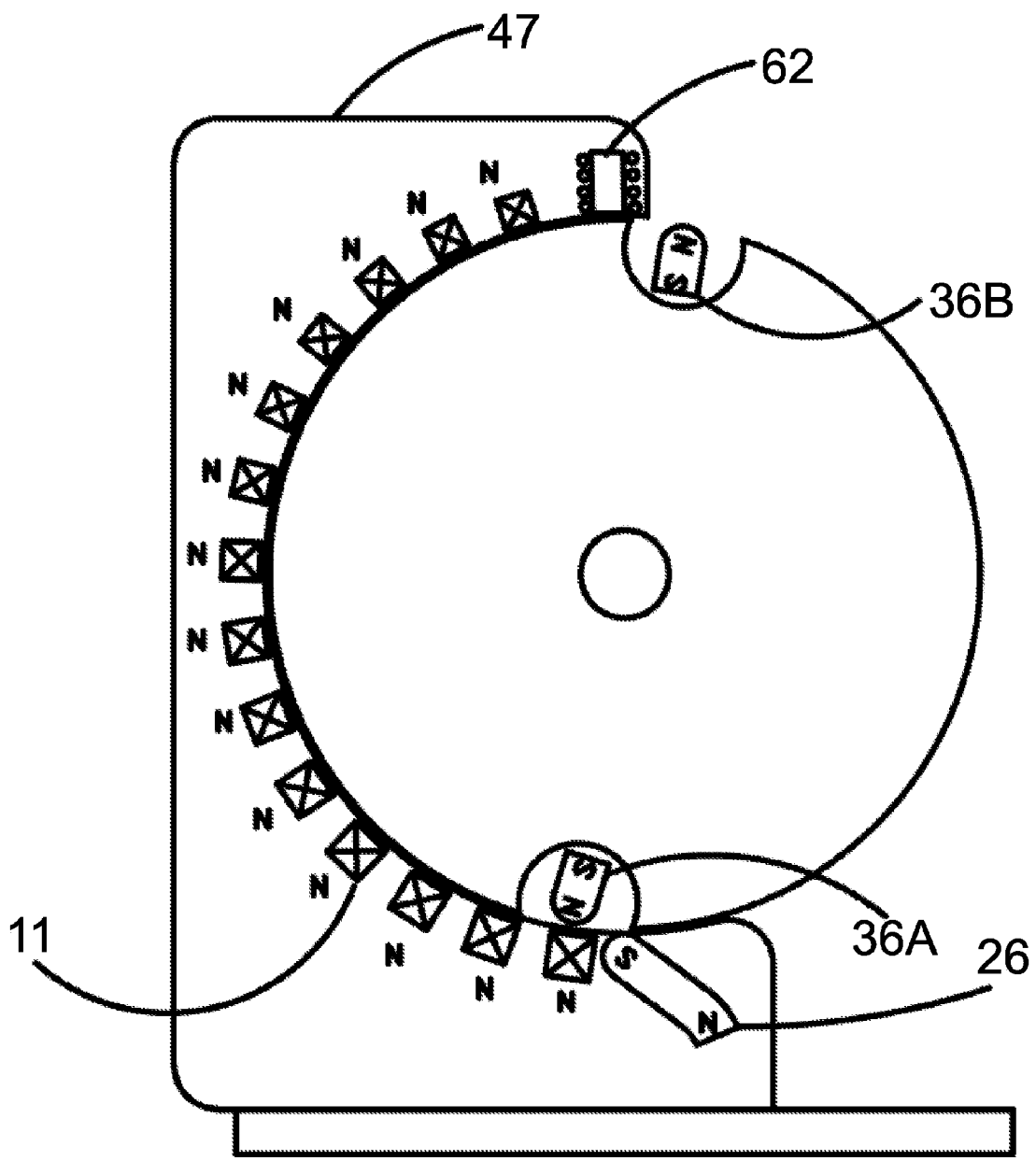
FIG. 2 is a cross sectional view of the permanent magnet motor of FIG. 1.

The fixed stator magnets 11 as shown in FIG. 2 are arranged with their pole faces in a radial orientation having their S-pole facing inward towards the rotor magnets 36A and 36B.

The rotor magnets 36A and 36B are arranged to have their N-pole facing outward. The main stator magnet 26 has its S-pole facing inward.

Figure 5:
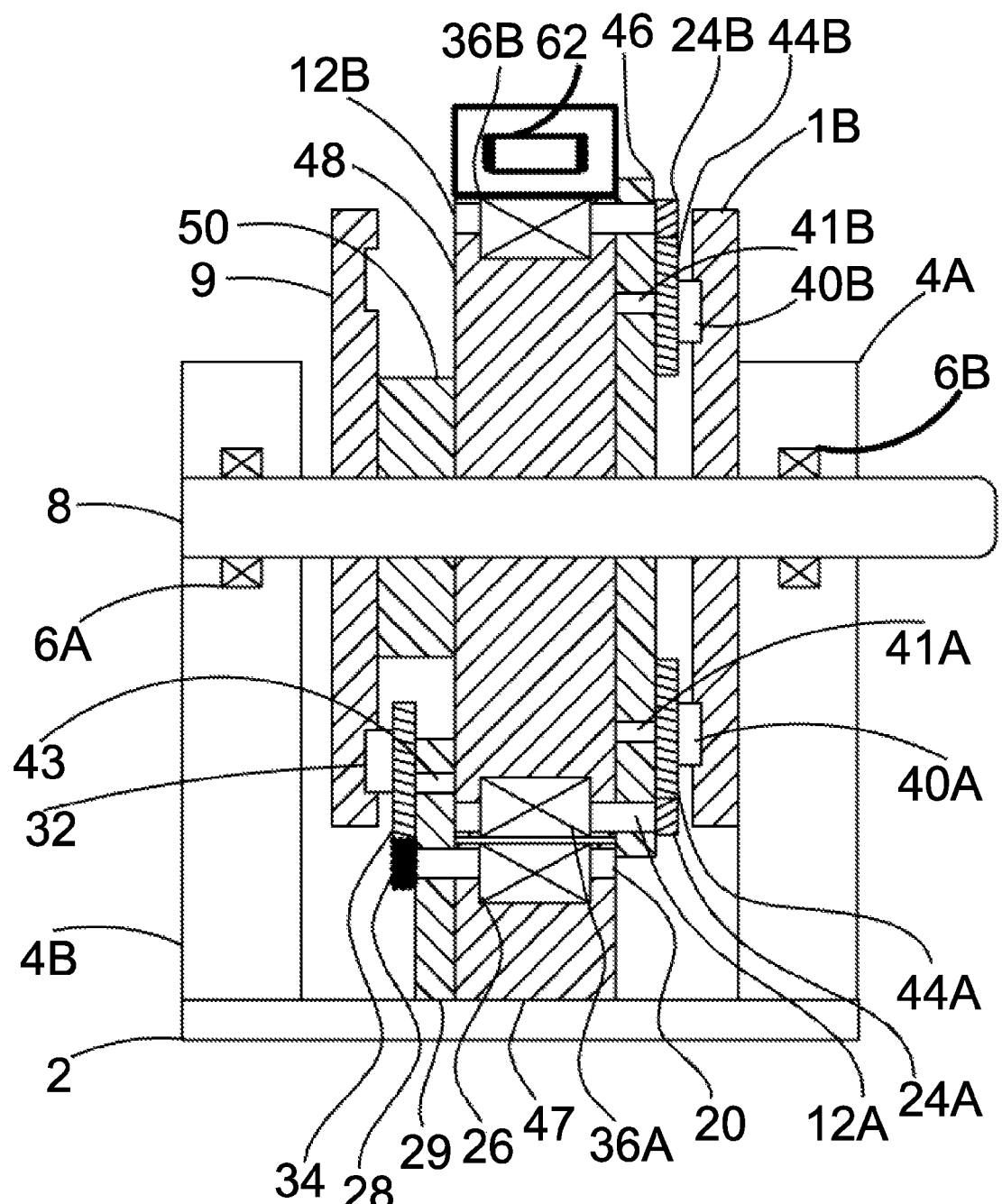
FIG. 5 is a cross sectional view of the permanent magnet motor of FIG. 4.

Referring to FIG. 5, the stator cam follower 32 runs in a groove within the stator cam plate 9. The cam follower 32 is rotatably mounted to the gear 34. The gear 34 is rotatably mounted to the shaft 43, and is meshed with the gear 28. The stator shaft 20 is fixedly attached to the stator gear 28. The cam profile in the stator cam plate 9, is responsible for positioning the main stator magnet 26 by ultimately causing the rotation of the stator shaft 20, to which the main stator magnet 26 is fixedly attached.

Referring to FIG. 5, the rotor cam followers 40A and 40B runs in a groove within the rotor cam plate 18. The cam followers 40A and 40B are rotatably mounted to their respective gears 44A and 44B. The gear 44A is rotatably mounted to the shaft 41A, and is meshed with the gear 24A. The gear 44B is rotatably mounted to the shaft 41B, and is meshed with the gear 24B. The cam profile in the rotor cam plate 18, is responsible for positioning the rotor magnet 36A and 36B by ultimately causing the rotation of the rotor shafts 12A and 12B, to which the rotor magnets 36A and 36B are fixedly attached.

Figure 3:
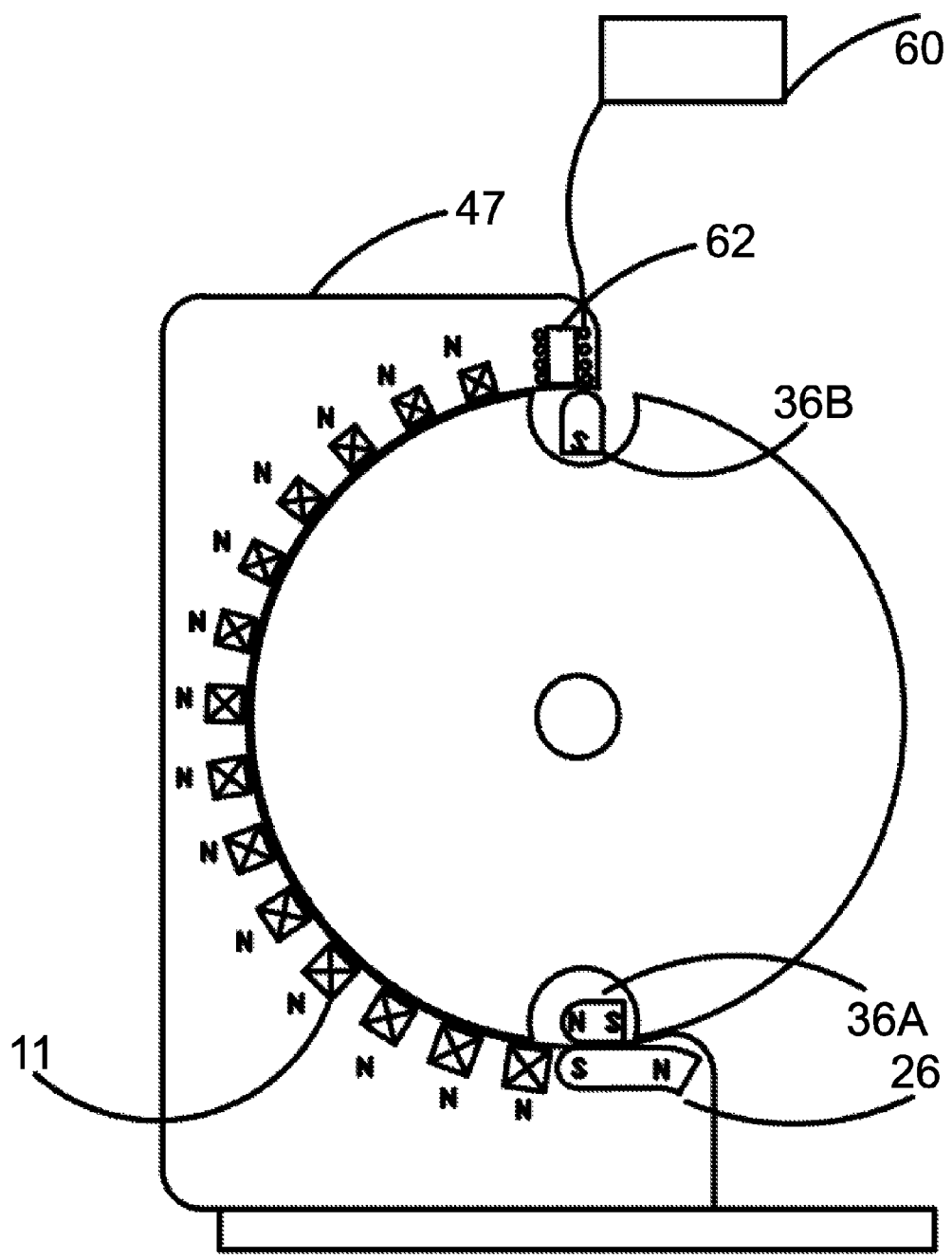
FIG. 3 is a cross sectional view of the permanent magnet motor of FIG. 1.
Figure 4:
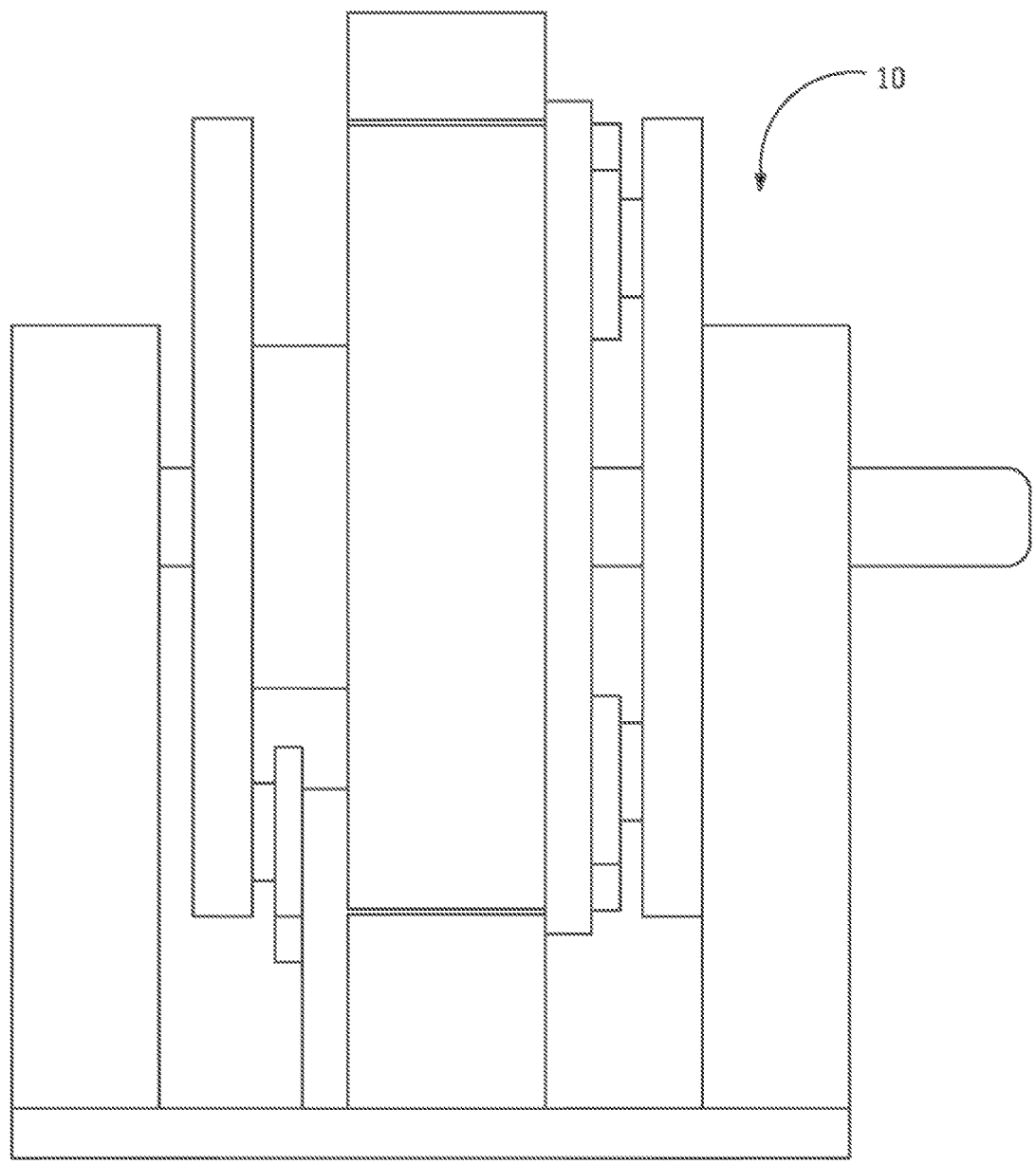
FIG. 4 is a front view of the permanent magnet motor of FIG. 1.

Referring to FIG. 2, when one of the rotor magnets 36A or 36B is near any of the fixed stator magnets 11, the attractive magnetic forces causes either of them to accelerate towards the main stator magnet 26. Each successive fixed stator magnet 11 is larger in size and strength as they approach the main stator magnet 26. This arrangement produces an increasing magnetic field in the direction of the main stator magnet 26. In effect, a magnetic ramp is created causing a rotational torque to be applied to the rotor 48. When the rotor magnet 36A approaches the main stator magnet 26, both of these magnets are independently rotated in unison in opposite directions until they are approximately parallel as shown in FIG. 3. As the rotor magnet 36A passes by the main stator magnet 26, it moves through an area of diminishing magnetic field strength, thereby encountering only a small cogging effect. The main stator magnet 26 is longer (distance between the north and south pole faces) than the rotor magnet 36A, this feature is key to minimizing any cogging effect between the S-pole face of the stator magnet 26 and the N-pole face of the rotor magnet 36A. Further, since the N-pole face of the main stator magnet 26 is curved away from the rotor magnet 36A, very little cogging effect is transmitted to the rotor magnet 36A as it passes.

The main stator magnet 26 and rotor magnets 36A and 36B have full radius faces on their pole faces that are being used in attraction. This feature allows their full attractive magnetic forces to be used to aid in rotation of the rotor 48.

As illustrated in FIGS. 2, 3 and 5, a power source 60 connected to electro-magnet 62 may be used to initiate rotation or maintain rotational speed of the rotor 48. The rotor 48 is able to rotate using permanent magnets assisted by power source 60. Further, the novel magnetic gate formed by the preferred embodiment provides a low cogging means to assist in separation of two permanent magnets.

In its broad sense, the present invention is a permanent magnet motor providing rotational torque.

The advantages of the present invention include, without limitation, that it is able to rotate using permanent magnets. Further, the novel magnetic gate formed by the preferred embodiment provides a low cogging means to separate two permanent magnets.

In the illustrated embodiment, the rotational torque /permanent magnet motor 10 and method of use include an external power source 60 (e.g., to initiate rotation of rotor 48, maintain rotational speed of rotor 48, accelerate rotational speed of rotor 48).

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A device for providing rotational torque, comprising:
   a driveshaft;
   a stator with a permanent main stator magnet, a permanent main stator magnet rotation mechanism that rotates the permanent main stator magnet in the stator, and a plurality of permanent magnets arranged in a circumferential arrangement relative to the rotor and increasing in magnetic flux density approaching the permanent main stator magnet;
   a rotor mounted to the driveshaft for rotation therewith and arranged on one side of the stator, the rotor including a pair of permanent rotor magnets on opposite sides, and a pair of permanent rotor magnet rotation mechanisms that respectively rotate the permanent rotor magnet in the rotor ;
   a power source for assisting rotation of the rotor;

wherein the permanent main stator magnet rotation mechanism and the permanent rotor magnet rotation mechanisms are operable so as to cause the permanent main stator magnet and the permanent rotor magnet to have their pole faces pointed towards each other only as they are approaching.

2. The device for providing rotational torque of claim 1, wherein the permanent main stator magnet rotation mechanism and the permanent rotor magnet rotation mechanisms are timed with the circumferential location of the permanent rotor magnets relative to the permanent main stator magnet so that the passing permanent rotor magnet and the permanent main stator magnet are approximately parallel as the permanent rotor magnet passes the permanent main stator magnet, whereby the cogging effect between the permanent rotor magnet and the permanent main stator magnet is reduced.

3. The device for providing rotational torque of claim 1, wherein the permanent main stator magnet includes a length that is longer than, and proportional to, the length of the permanent rotor magnets.

4. The device for providing rotational torque of claim 1, wherein the permanent main stator magnet includes a non-working end that curves away from the permanent rotor magnet.

5. The device for providing rotational torque of claim 1, wherein the permanent main stator magnet and the permanent rotor magnet include attractive pole faces with respective convex surfaces.

6. The device for providing rotational torque of claim 5, wherein the respective convex surfaces include a full radius.

7. The device for providing rotational torque of claim 1, further including support structures to support the permanent main stator magnet and the permanent rotor magnets, and the support structures are non magnetic.

8. A method of using a device for providing rotational torque, the device for providing rotational torque including a driveshaft; a stator with at least one rotating permanent main stator magnet and a plurality of fixed permanent stator magnets at spaced intervals extending towards the main stator magnet; a rotor mounted to the driveshaft for rotation therewith and including at least one rotating permanent rotor magnet, and an electro-magnet associated with the stator and connected to an external power source the method comprising;

rotating the rotor and driveshaft relative to the stator using the stator magnets and the electro-magnet;
rotating the at least one rotating permanent main stator magnet relative to the stator;
rotating the at least one rotating permanent rotor magnet relative to the rotor;

timing the rotation of the at least one rotating permanent main stator magnet, the at least one rotating permanent rotor magnet, and the rotation of rotor so that a diminishing magnetic field is created as the at least one permanent rotor magnet moves away from the attracting pole of the at least one permanent main stator magnet.

9. The method of claim 8, wherein timing includes timing the rotation of the at least one rotating permanent main stator magnet, the at least one rotating permanent rotor magnet, and the rotation of rotor so as to cause the at least one permanent main stator magnet and the at least one permanent rotor magnet to have their pole faces pointed towards each other only as they are approaching.

10. The method of claim 8, wherein timing includes timing the rotation of the at least one rotating permanent main stator magnet, the at least one rotating permanent rotor magnet, and the rotation of rotor so that the at least one permanent rotor magnet and the at least one permanent main stator magnet are initially approximately parallel and cogging force between the at least one permanent rotor magnet and the at least one main stator magnet is reduced as the at least one permanent rotor magnet passes the at least one permanent main stator magnet.

11. A device for providing rotational torque, comprising:
a driveshaft;
a stator with a permanent main stator magnet, a permanent main stator magnet rotation mechanism that rotates the permanent main stator magnet in the stator, and a plurality of permanent magnets arranged in a circumferential arrangement and arranged increasing in magnetic flux density with each permanent magnet approaching the permanent main stator magnet;
a rotor mounted to the driveshaft for rotation therewith and arranged on one side of the stator, the rotor including a pair of permanent rotor magnets, and a pair of permanent rotor magnet rotation mechanisms that respectively rotate the permanent rotor magnet in the rotor;
the permanent main stator magnet having a first magnetic flux density, at least one of the permanent rotor magnets having a second magnetic flux density, and the permanent magnets having increasing magnetic flux density around said circumferential arrangement and including a strongest permanent magnet with a third magnetic flux density, and the first magnetic flux density is at least as great as the second magnetic flux density and the third magnetic flux density; and
an external power source for assisting rotation of the rotor.

12. The device of claim 11, further comprising an electro-magnet mounted on the stator and connected to the external power source to keep the rotor moving past the stator magnets.

* * * * *